Figure 1:
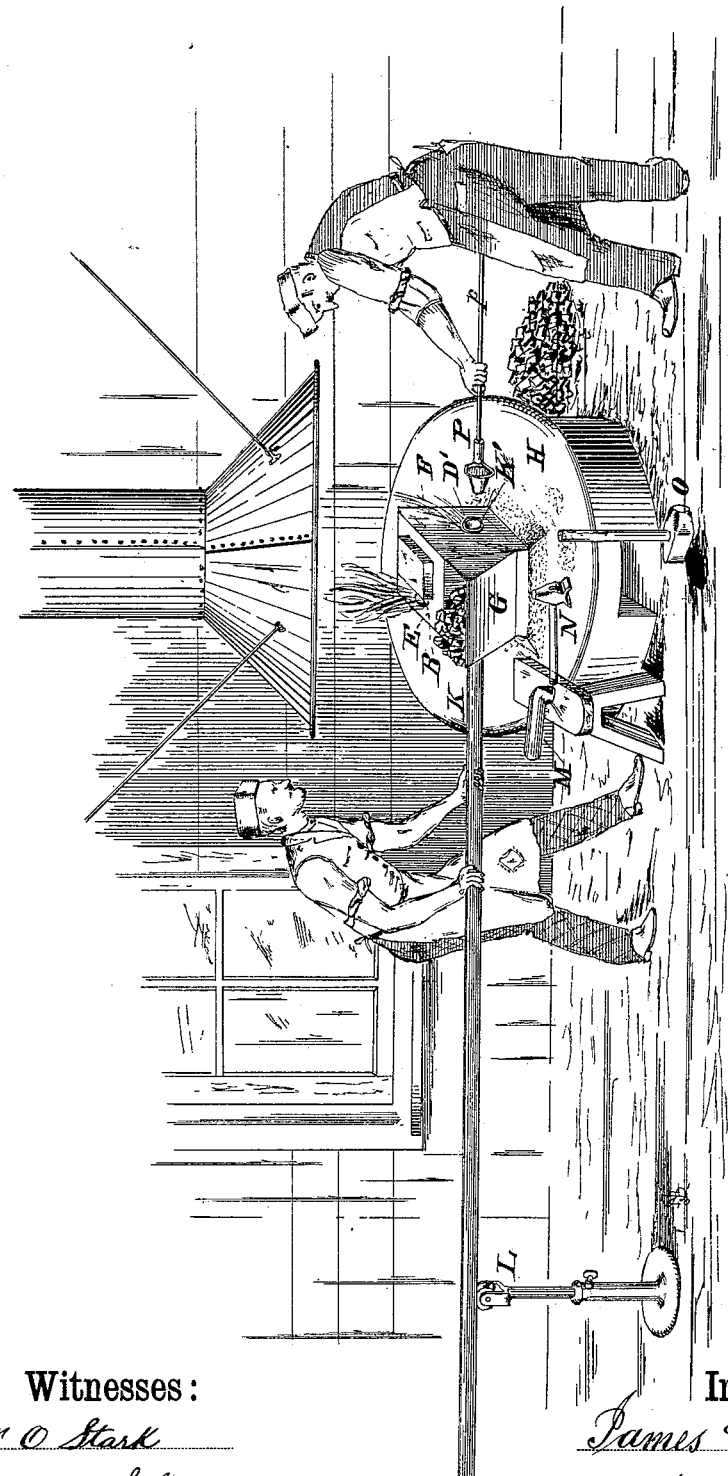

(No Model.) 2 Sheets—Sheet 1.

J. CUMMING.
DEVICE FOR WELDING THE ENDS OF BOILER FLUES.

No. 403,520. Patented May 21, 1889.

Witnesses:
Wm O Stark
Centie S Stark

Inventor:
James Cumming,
by Michael P Stark
Attorney.

(No Model.) 2 Sheets—Sheet 2.
J. CUMMING.
DEVICE FOR WELDING THE ENDS OF BOILER FLUES.
No. 403,520. Patented May 21, 1889.
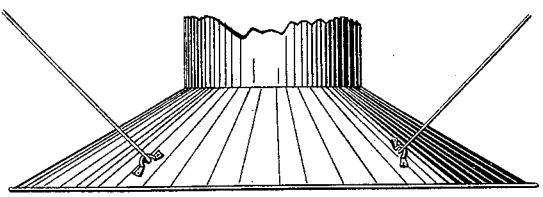
FIG. 2.
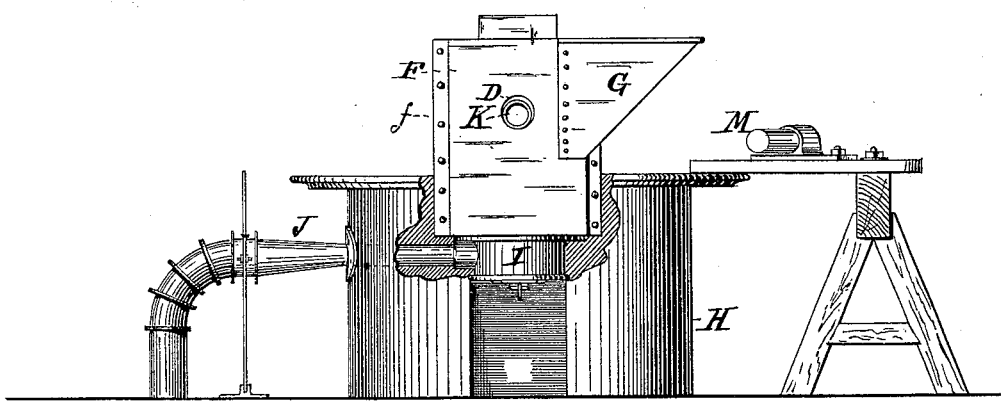
FIG. 3.
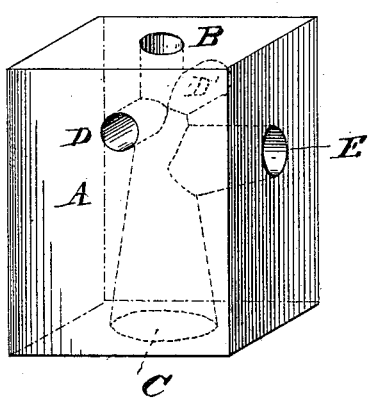
FIG. 4.
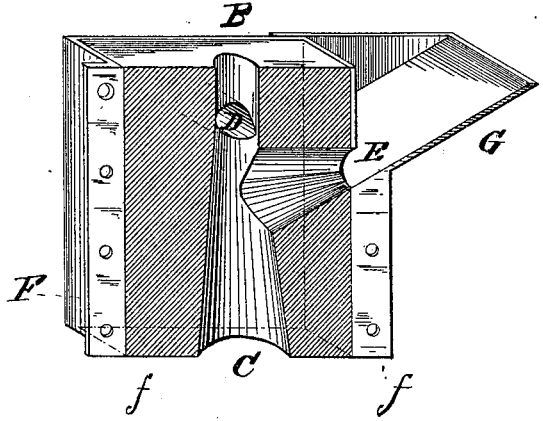
Witnesses:
Wm O Stark
Centie S Stark
Inventor:
James Cumming
by Michael J Stark
Attorney.

UNITED STATES PATENT OFFICE.

JAMES CUMMING, OF BUFFALO, NEW YORK.

DEVICE FOR WELDING THE ENDS OF BOILER-FLUES.

SPECIFICATION forming part of Letters Patent No. 403,520, dated May 21, 1889.

Application filed March 28, 1889. Serial No. 305,146. (No model.)

*To all whom it may concern:*

Be it known that I, JAMES CUMMING, of Buffalo, in the county of Erie and State of New York, have invented certain new and useful Improvements in Devices for Welding the Ends of Boiler-Flues; and I do hereby declare that the following description of my said invention, taken in connection with the accompanying sheets of drawings, forms a full, clear, and exact specification, which will enable others skilled in the art to which it appertains to make and use the same.

This invention has general reference to improvements in devices for welding the ends of boiler-flues; and it consists, essentially, in the novel and peculiar combination of parts and details of construction, as hereinafter first fully set forth and described, and then pointed out in the claims.

In the drawings already referred to, which serve to illustrate my said invention more fully, Figure 1 is a perspective view of the device for welding the ends of boiler-flues, showing workmen engaged in heating the same. Fig. 2 is a front elevation of the same. Fig. 3 is a perspective view of the furnace-brick proper, and Fig. 4 a longitudinal sectional elevation.

Like parts are designated by corresponding letters of reference in all the figures.

The object of this invention is the production of an efficient and serviceable mechanism for welding the ends of boiler-flues. These flues, when any repairs have to be done to a steam-generator, are cut off inside of the flue-sheet, and are therefore too short to be again used in the same boiler, and have to be lengthened to their original longitudinal dimension for this purpose. To lengthen them, the flues are scarfed or tapered on the outside on that end where the piece is to be welded on, and this piece is tapered internally to fit the flue. These pieces are usually from six to eight inches long, and are placed into a furnace together with the flue and brought to a welding heat and then welded upon a properly-arranged beak-horn.

The furnace in my device consists, preferably, of a single piece of fire-brick molded in a suitable manner to produce a rectangular block, A, having in its longitudinal center a passage, B, of about three and one-half inches in diameter, the lower end of which tapers to a larger size at C. At a suitable distance below the top of this block A, I provide a transverse passage, D, crossing said longitudinal passage at proper distance from the top of the top of the block A. At right angles to the passage D, but on one side only, and directly below the passage D, I provide a further passage, E, which passage is also tapering, similar to the passage C.

The block A, I inclose within a metallic jacket, F, of two pieces, having each longitudinal flanges *f*, provided with screw-holes through which bolts are passed to secure the two halves together, and on one side with a chute, G, receiving the fuel with which the furnace is to be supplied to produce the necessary heat.

The furnace A is placed upon a common blacksmith's hearth, H, resting it upon the tuyere-iron I in such a manner that the blast entering said tuyere through the blast-pipe J will discharge into the vertical passage C B of the furnace-block A, while the boiler-flue K, resting with one end upon a carrier or stand, L, enters the passage D and the short portion K' of the flue to be welded on entering the passage D', the joints of the flue meeting in the center of the furnace-block at the intersecting point of the passages B C D D'.

The operation of this device is substantially as follows: As soon as the boiler-flue K and its lengthening-piece K' are heated to nearly a welding heat, the blacksmith revolving the flue for this purpose, the helper taps the lengthening piece on its edge lightly with a hammer to force the tapering portions into each other, and as soon as a full welding heat is attained, which can be observed through the opening or passage B in the furnace-block A, the flue is removed from the furnace and pushed upon the beak-horn M, when the smith takes hold of the swage N and the helper of the sledge-hammer O, and, striking said swage lightly, but quickly, forces the joint of the flue into solid contact, thereby welding the pieces together, the entire operation being performed in a space of time occupying less than two minutes by the watch. To enable the smith to revolve the flue, together with its extension-piece, the helper forces and keeps the two pieces in contact (as long as the welding heat has not yet reached a point where the parts will "stick") by means of an implement consisting of a rod, $p$, Fig. 1, having a taper swiveling head-piece, P, entering the extension-piece K', he pushing it toward the flue K until the heat will cause them to stick to each other, as described.

The furnace-block A can be readily produced from fire-clay, molded and baked or fired in the usual manner, and since it constitutes the principal portion of my device for welding the ends of the flues, it may be manufactured and sold separately and independently of the remaining portions of the same. The fire in the furnace-block is started in the central longitudinal passage B C, Connellsville coke or other suitable coal of a size corresponding to "nut" size being used, the fuel being supplied through the chute G and the passage E, in a manner readily comprehended.

Instead of making the furnace-block A of a single piece, as described, I may construct the same of several pieces without changing the nature of my invention. I prefer the construction set forth for the reason that it produces a more durable article and a hotter fire, owing to the fact, I believe, that there is no escape of gases through leaky or faulty joints.

Having thus fully described my invention, I claim as new and desire to secure to me by Letters Patent of the United States of America—

1. The hereinbefore-described attachment for furnaces for welding the ends of boiler-flues, consisting of the block A, having longitudinal passage B C and transverse passages D D', and a feed-passage, E, the said block being adapted for use with the hearth and tuyere, as and for the purpose set forth.

2. The herein-described devices for welding the ends of boiler-flues, consisting of the following-named parts jointly: the hearth H and tuyere I, the furnace A, standard L, beak-horn M, push-rod P, swage N, and sledge-hammer O, as and for the object stated.

3. As an improved article of manufacture, a furnace-block, substantially as described, having longitudinal passage B enlarged at C, transverse passage D D', and tapering feed-opening E, the whole being formed substantially as described and stated.

In testimony that I claim the foregoing as my invention, I have hereto set my hand in the presence of two subscribing witnesses.

JAMES CUMMING.

Witnesses:
MICHAEL J. STARK,
WM. O. STARK.